(12) United States Patent
Trombley et al.

(10) Patent No.: US 8,903,697 B2
(45) Date of Patent: Dec. 2, 2014

(54) SOLUTIONS FOR MODELING SPATIALLY CORRELATED VARIATIONS IN AN INTEGRATED CIRCUIT

(75) Inventors: Henry W. Trombley, Starksboro, VT (US); Josef S. Watts, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 13/233,176

(22) Filed: Sep. 15, 2011

(65) Prior Publication Data

US 2013/0073266 A1    Mar. 21, 2013

(51) Int. Cl.
*G06F 17/50*    (2006.01)

(52) U.S. Cl.
CPC ........ *G09F 17/5068* (2013.01); *G06F 2217/10* (2013.01)
USPC ................ 703/14; 703/19; 716/106; 716/111

(58) Field of Classification Search
CPC ............ G06F 17/5081; G06F 17/5022; G06F 17/5036; G06F 17/5068; G06F 17/5045; G03F 7/705; G03F 17/5045
USPC .......................................................... 703/2
See application file for complete search history.

(56) References Cited

U.S. PATENT DOCUMENTS

| 6,314,390 | B1 | 11/2001 | Bittner et al. | |
|---|---|---|---|---|
| 6,553,542 | B2 * | 4/2003 | Ramaswamy et al. | 716/112 |
| 7,263,477 | B2 | 8/2007 | Chen et al. | |
| 7,356,784 | B1 | 4/2008 | Dengi et al. | |
| 7,487,473 | B2 * | 2/2009 | Mina et al. | 716/104 |
| 7,533,359 | B2 * | 5/2009 | Scheffer et al. | 716/106 |
| 7,640,143 | B2 | 12/2009 | Bittner et al. | |
| 7,669,152 | B1 | 2/2010 | Tcherniaev et al. | |
| 7,779,373 | B2 * | 8/2010 | Tanaka | 716/111 |
| 7,783,466 | B2 | 8/2010 | Jones et al. | |
| 8,000,826 | B2 * | 8/2011 | Luo et al. | 700/95 |
| 8,271,256 | B2 * | 9/2012 | Khalily et al. | 703/14 |
| 2002/0073388 | A1 * | 6/2002 | Orshansky et al. | 716/5 |
| 2004/0002844 | A1 | 1/2004 | Jess et al. | |

OTHER PUBLICATIONS

Cheng et al, "Physically Justifiable Die-Level Modeling of Spatial Variation in View of Systematic Across Wafer Variability", IEEE Transactions on Computer-Aided Design of Integrated Circuits and Systems, vol. 30, No. 3, Mar. 2011.*

(Continued)

*Primary Examiner* — Mary C Jacob
(74) *Attorney, Agent, or Firm* — David A. Cain; Hoffman Warnick LLC (57) ABSTRACT

A computer-implemented method for modeling Spatially Correlated Variation (SCV) in a design of an Integrated Circuit (IC) is disclosed. In one embodiment, the method includes: generating a set of coefficient values for a position dependent SCV function, the set of coefficient values being selected from a set of random variables; obtaining a set of coordinates defining a position of each of a plurality of devices in a defined field; evaluating the position dependent SCV function to determine a device attribute variation for each of the plurality of devices based upon the coordinates of each of the plurality of devices; modifying at least one model parameter based upon the evaluation of the position dependent SCV function; and running a circuit simulation using the at least one modified model parameter.

15 Claims, 11 Drawing Sheets

(56) References Cited

OTHER PUBLICATIONS

Orshansky et al, "Impact of Spatial Intrachip Gate Length Variability on the Performance of High-Speed Digital Circuits", IEEE Transactions on Computer-Aided Design of Integrated Circuits and Systems, vol. 21, No. 5, May 2002.*

Yang et al, "Advanced Timing Analysis Based on Post-OPC Patterning Process Simulations", Design and Process Integration for Microelectronic Manufacturing III, Proceedings of SPIE vol. 5756, 2005.*

Matsumoto et al, "Suppression of Intrinsic Delay Variation in FPGA's using Multiple Configurations", ACM transactions on Reconfigurable Technology and Systems, vol. 1, No. 1, Article 3, Mar. 2008.*

Ghanta, et al. "Stochastic Power Grid Analysis Considering Process Variations," 2005, 6 pages, FreeScale Semiconductor Inc., Austin, USA.

Okada, et al. "A Statistical Gate Delay Model for Intra-chip and Inter-chip Variabilities," 10 pages, Kyoto University, Graduate School of Informatics, Department of Communications and Computer Engineering, Kyoto, Japan, Proceedings of 2003 IEEE/ACM International Conference on Computer Aided Design, 2003.

Onodera, Hidetoshi, "Variability Modeling and Impact on Design," 4 pages, Kyoto University, Graduate School of Informatics, Kyoto, Japan, IEEE International Devices Meeting, Dec. 15-17, 2008.

* cited by examiner

SOLUTIONS FOR MODELING SPATIALLY CORRELATED VARIATIONS IN AN INTEGRATED CIRCUIT

BACKGROUND

The subject matter disclosed herein relates to solutions for modeling objects in the design of integrated circuits. More specifically, the subject matter disclosed herein relates to developing a function and generating a model of spatially correlated attribute variation in an integrated circuit, and an associated design structure.

The design and manufacture of integrated circuit devices includes accounting for attribute and dimensional variations as a result of device location and various manufacturing processes (e.g., lithography, processing, etc.). Devices which in the initial design are intended to be identical, may, when actually manufactured on a chip, have variations in critical dimensions or electrical characteristics as a result of manufacturing processes and the relative positions of the devices on the chip. Design techniques which limit or control these variations can increase the size of the chip and impact the performance of those devices significantly. Generating accurate and workable models of these variations can help to reduce the size of the chip and aid in effectively designing the integrated circuit to avoid or account for these effects in advance.

Conventional approaches for evaluating and modeling these variations between devices on a chip include assigning a standard amount of independent random variation to each device on the chip, or dividing the chip into a number of sections and assigning a single random variation value to each section (and each device in that section) on the chip. However, these approaches fail to adequately account for spatial correlations in device variances, and thus, generate discontinuous models which may be inaccurate and/or lead to overdesigning.

BRIEF SUMMARY

A computer-implemented method of modeling Spatially Correlated Variation for an integrated circuit design is disclosed. In one embodiment, the method includes: generating a set of coefficient values for a position dependent SCV function, the set of coefficient values being selected from a set of random variables; obtaining a set of coordinates defining a position of each of a plurality of devices in a defined field; evaluating the position dependent SCV function to determine a device attribute variation for each of the plurality of devices based upon the coordinates of each of the plurality of devices; modifying at least one model parameter based upon the evaluation of the position dependent SCV function; and running a circuit simulation using the at least one modified model parameter.

A first aspect includes a computer-implemented method for modeling Spatially Correlated Variation (SCV) for an integrated circuit design, the method including: generating a set of coefficient values for a position dependent SCV function, the set of coefficient values being selected from a set of random variables; obtaining a set of coordinates defining a position of each of a plurality of devices in a defined field; evaluating the position dependent SCV function to determine a device attribute variation for each of the plurality of devices based upon the coordinates of each of the plurality of devices; modifying at least one model parameter based upon the evaluation of the position dependent SCV function; and running a circuit simulation using the at least one modified model parameter.

A second aspect includes a computer system having: at least one computing device configured to model Spatially Correlated Variation (SCV) by performing actions including: generating a set of coefficient values for a position dependent SCV function, the set of coefficient values being selected from a set of random variables; obtaining a set of coordinates defining a position of each of a plurality of devices in a defined field; evaluating the position dependent SCV function to determine a device attribute variation for each of the plurality of devices based upon the coordinates of the plurality of devices; modifying at least one model parameter based upon the evaluation of the position dependent SCV function; and running a circuit simulation using the at least one modified model parameter.

A third aspect includes a computer program comprising program code embodied in at least one computer-readable storage medium, which when executed, enables a computer system to model Spatially Correlated Variation (SCV) for an integrated circuit design by performing actions including: generating a set of coefficient values for a position dependent SCV function, the set of coefficient values being selected from a set of random variables; obtaining a set of coordinates defining a position of each of a plurality of devices in a defined field; evaluating the position dependent SCV function to determine a device attribute variation for each of the plurality of devices based upon the coordinates of each of the plurality of devices; modifying at least one model parameter based upon the evaluation of the position dependent SCV function; and running a circuit simulation using the at least one modified model parameter.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As noted herein, the subject matter disclosed herein relates to solutions for modeling objects in the design of integrated circuits. More specifically, the subject matter disclosed herein relates to developing a function and generating a model of spatially correlated attribute variation in an integrated circuit, and an associated design structure.

As integrated circuit technologies shrink in size along with advancements in technology, variations in device dimensions and electrical characteristics can impact the performance of those integrated circuits significantly. Generating accurate and workable models of the devices (e.g., transistors, resistors, capacitors, interconnect lines, vias, etc.) can aid in effectively designing the integrated circuit to avoid negative effects or account for these effects in advance.

Conventional approaches for modeling attribute variations (e.g., ACLV) and evaluating the negative effects of these variations (e.g., increased IC size), include: assigning a standard amount of independent random variation to each device on the chip, or dividing the chip into a number of sections and assigning a single random variation value to each section (and each device in that section) on the chip. However, these approaches fail to produce a continuous model which accounts for spatial correlations in device attribute variations, leading to inaccurate models and overdesigning of the IC.

In contrast to these conventional approaches, aspects of the invention include formulating and generating models for Spatially Correlated Variation (SCV) (e.g., Across Chip Length Variation (ACLV)) using a continuous function of position in a Monte Carlo simulation. For example, an ACLV function may be a position-dependent function which includes a set of coefficient values which are generated from a set of random variables. The ACLV function may be used to evaluate any number of devices on an IC with respect to the coordinates of each device. The ACLV function determining an amount of variation for each device, which is spatially correlated to other devices on the IC. Each device is evaluated by the ACLV function a number of times as part of a Monte Carlo simulation which generates a set of variation values for the IC design.

In one aspect, a computer-implemented method is disclosed including the following processes:

(A) generating a set of coefficient values for a position dependent SCV function, the set of coefficient values being selected from a set of random variables;

(B) obtaining a set of coordinates defining a position of each of a plurality of devices in a defined field;

(C) evaluating the position dependent SCV function to determine a device attribute variation for each of the plurality of devices based upon the coordinates of each of the plurality of devices;

(D) modifying at least one model parameter based upon the evaluation of the position dependent SCV function; and (E) running a circuit simulation using the at least one modified model parameter.

In one embodiment, the ACLV function may be further dependent upon and/or account for other variation factors (e.g., PC density, RX, etc) by including a set of terms and/or coefficients which account for the known or anticipated variation effects.

Figure 1:
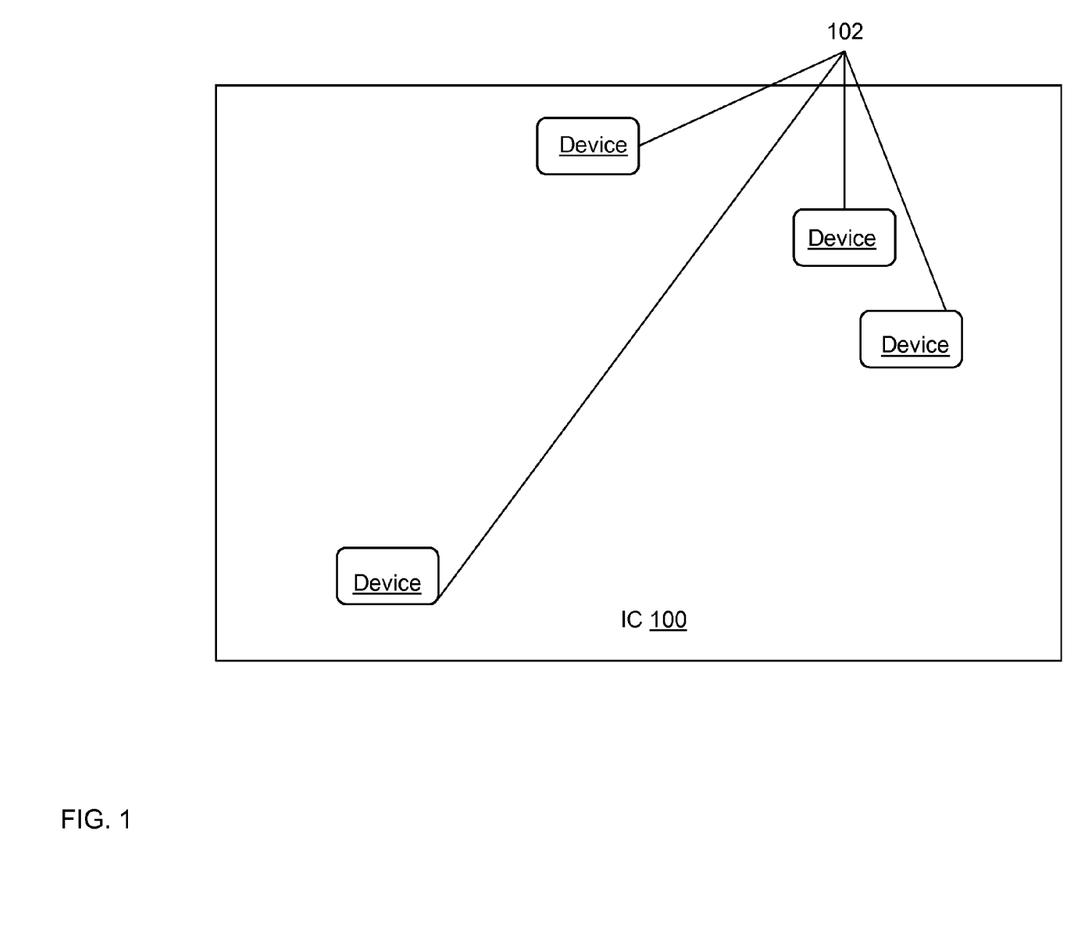
FIG. 1 shows a schematic depiction of a portion of an integrated circuit (IC) according to an embodiment.

Turning to FIG. 1, a schematic depiction of an integrated circuit (IC) 100 is shown. As shown, integrated circuit (IC) 100, includes a set of devices 102 disposed upon IC 100. Each device 102 in the set of devices 102 is located in a position on IC 100 which is independent of the other devices in the set. The position of each device 102 on IC 100 may be represented as a set of coordinates (e.g., x and y values). Each device 102 in the set of devices 102 is intended to have critical dimensions specified in the integrated circuit design. However, variations in these dimensions may develop as a result of manufacturing processes and the position of each device 102 on IC 100.

Figure 2:
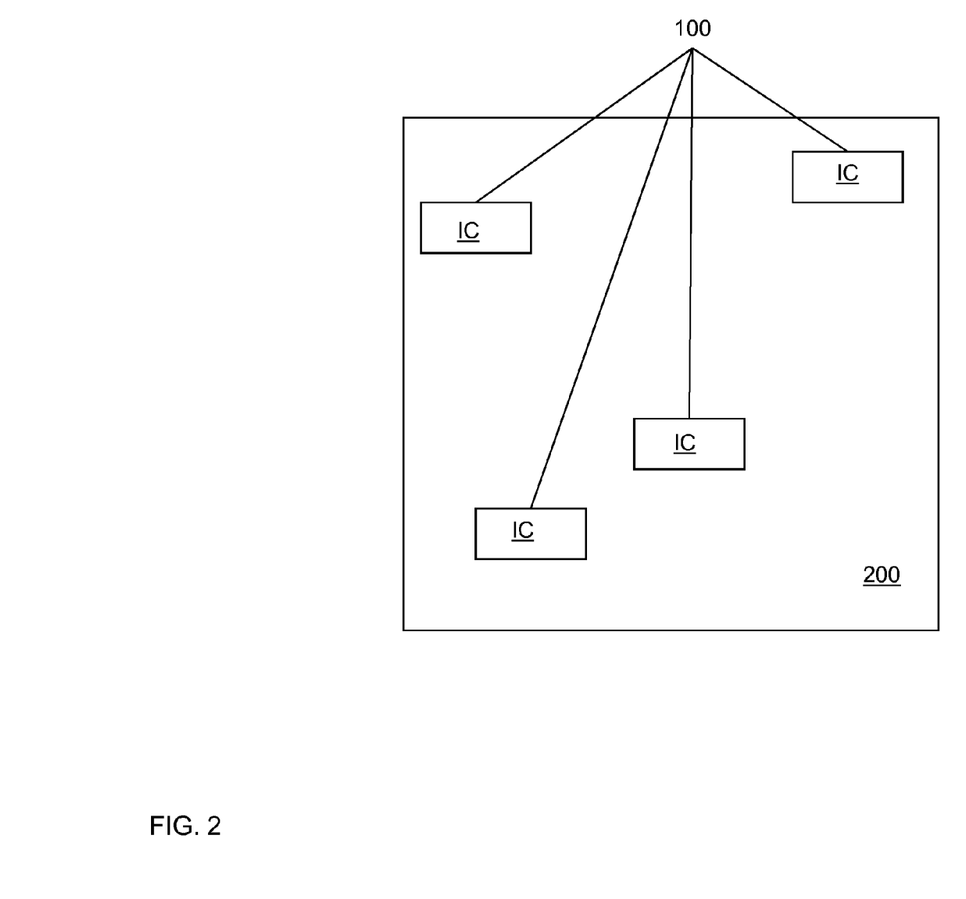
FIG. 2 shows a schematic depiction of an IC according to an embodiment.

FIG. 2 illustrates a schematic depiction of a photolithography field 200. Photolithography field 200 can include a plurality of integrated circuits 100. Each integrated circuit 100 being disposed upon photolithography field 200 with a unique position which can be defined by a set of coordinates (e.g., x and y values). The length variation of each integrated circuit 100 or the devices thereon, being partially determined by the position of integrated circuit 100 on photolithography field 200.

Figure 3:
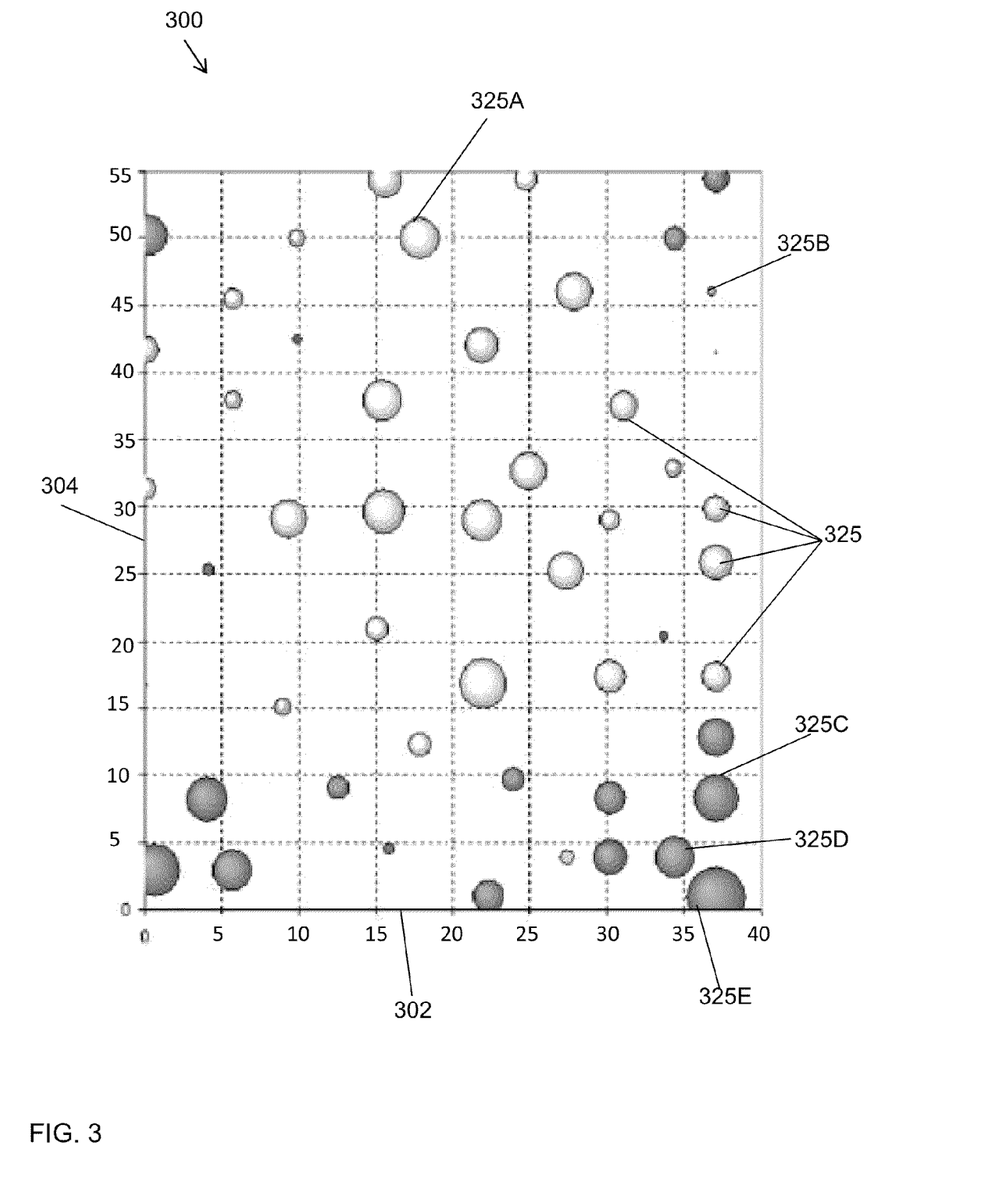
FIG. 3 shows a bubble chart representing Across Chip Length Variation (ACLV) according to an embodiment.

FIG. 3 illustrates a bubble chart 300 representing Across Chip Length Variation (ACLV) for a number of devices disposed on an integrated circuit (IC). Bubble chart 300 includes an x-axis 302 which represents increments of a first dimension of the IC and a y-axis 304 which represents increments of a second dimension of the IC. A plurality of devices which are disposed on the IC are graphically represented by bubbles 325 located at the respective positions/coordinates of the corresponding devices. Each bubble 325 represents an individual device, where the relative size of the bubble correlates to the average of dimensional/length variation measured at the individual device location. For instance, bubble 325A represents a device with a relatively large variation from design dimensions, whereas bubble 325B represents a device with a relatively small variation from design dimensions. Further, as can be seen with bubbles 325C, 325D and 325E, devices with similar locations/coordinates, can have correlated variations (e.g., a relatively consistent amount of variation due in part to a relatively similar location on the chip). It is understood that each bubble 325 represents a device and that not all bubbles/devices 325 in FIG. 3 have been labeled, this has been done for clarity in the illustration.

Figure 4:
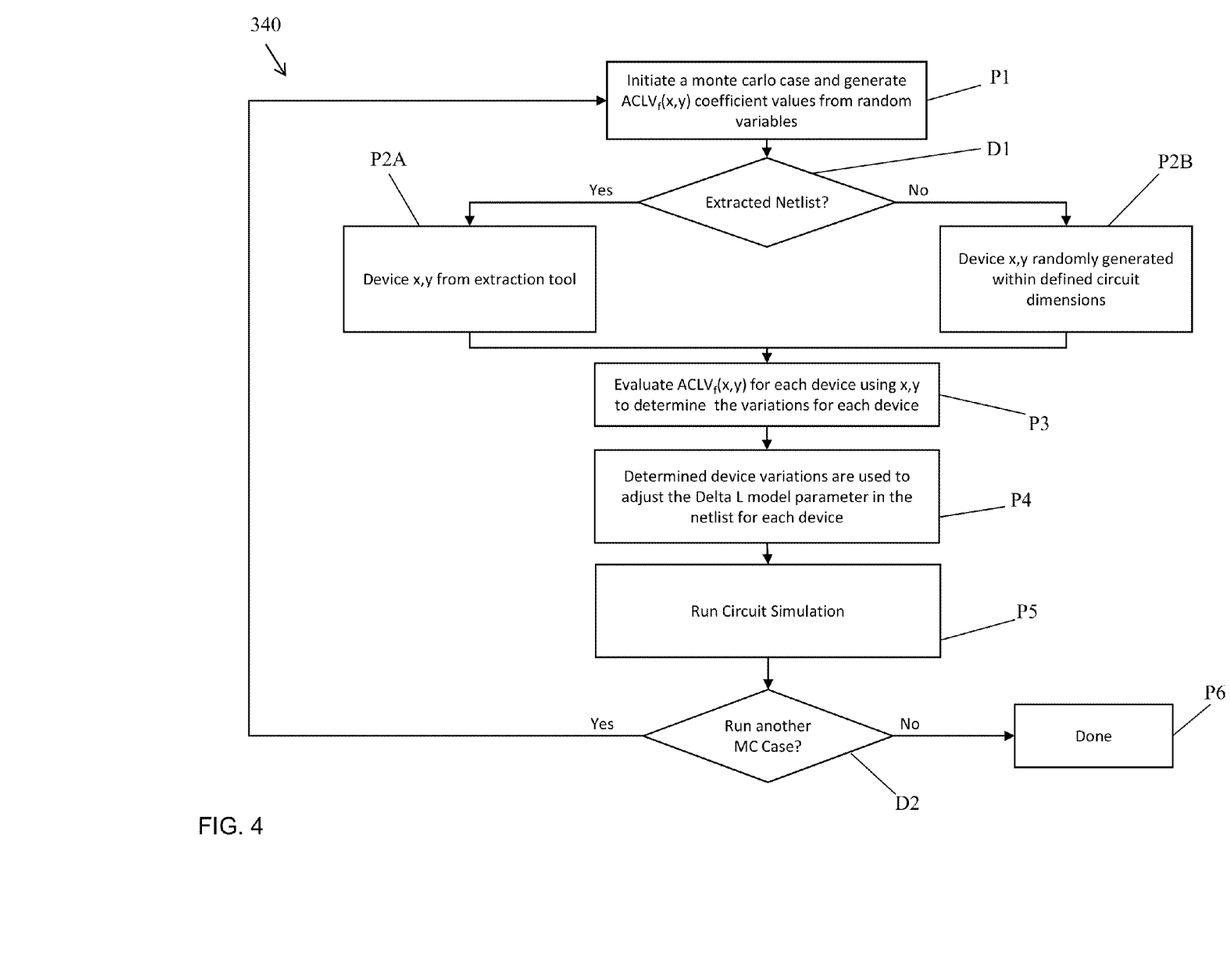
FIG. 4 shows a method flow diagram illustrating steps in a method of modeling ACLV in accordance with an embodiment.

Turning to FIG. 4, an illustrative method flow diagram 340 is shown illustrating a process according to aspects of the invention. In this embodiment, method flow diagram 340 illustrates processes in a method for modeling SCV (e.g., ACLV) for a set of devices, and running a Monte Carlo simulation on a corresponding IC. In this embodiment it is assumed that the ACLV probability distribution function is the same in all locations in the photolithography field. In process P1, a Monte Carlo case is initiated and a set of coefficient values for an ACLV function are generated, where the ACLV function includes an associated equation (e.g., (1), (2) or (3) illustrated and described herein), and the coefficient values are obtained from a set of random variables. In one embodiment, the set of random variables may be obtained from a defined field (e.g., 0 to a maximum, 0 to a minimum, etc.), so as to skew the results of the Monte Carlo simulation. In another embodiment, the coefficients may include factors for systematic variation (e.g., areas with high density PC, PC pitch, etc.). In another embodiment, the ACLV function may include a separate set of terms which account for systematic variation factors and/or effects, these terms based on layout information, PC density, RX, etc. This separate set of terms includes a set of independent coefficients which influence the ACLV function so as to further account for expected attribute variances. In any event, these factors account for variations from deterministic effects on the ACLV of devices. Following process P1, at decision D1, it is determined whether or not an extracted netlist has been obtained. If at decision D1, it is determined that an extracted netlist has been obtained, then at process P2A, a set of coordinates (e.g., x and y) are obtained from the extracted netlist for each device on the IC. However, if at decision D1 it is determined that an extracted netlist has not been obtained, then at process P2B, a set of coordinates is randomly generated for each device on the IC. The set of randomly generated coordinates are located within a set of defined IC dimensions. In one embodiment, the set of defined IC dimensions may be defined by a user. In another embodiment, the set of defined IC dimensions may correspond to a physical size of an IC.

In any event, following either of process P2A or process P2B, in process P3, the ACLV function is evaluated for each device, using the generated coefficient values and the obtained coordinates of each device. The evaluation generating an anticipated attribute variation (e.g., Delta L) for each device. Following process P3, in process P4, the device by device variations generated in process P3 are used to adjust the Delta L model parameter in the netlist for each device. Following process P4, in process P5, a circuit simulation is run for the IC, the circuit simulation including any or all of the modified variation parameters. In one embodiment, the circuit simulation models circuit operation and assists in design analysis. The circuit simulation replicates the behavior and operation of the current IC design in the physical world. Following process P5, in decision D2, it is determined whether or not another Monte Carlo case is to be run. In one embodiment, this decision may be user-prompted. In another embodiment, decision D2 may involve comparing the number of simulations run with a previously determined minimum number of simulations to be run. If in decision D2 it is determined that another simulation is to be run, then at process P1 a new set of coefficient values is again generated and the process is repeated. If at decision D2 it is determined that another Monte Carlo case is not necessary, then at process P6 the simulation is stopped. This object may be used in a later-performed layout design process.

Figure 5:
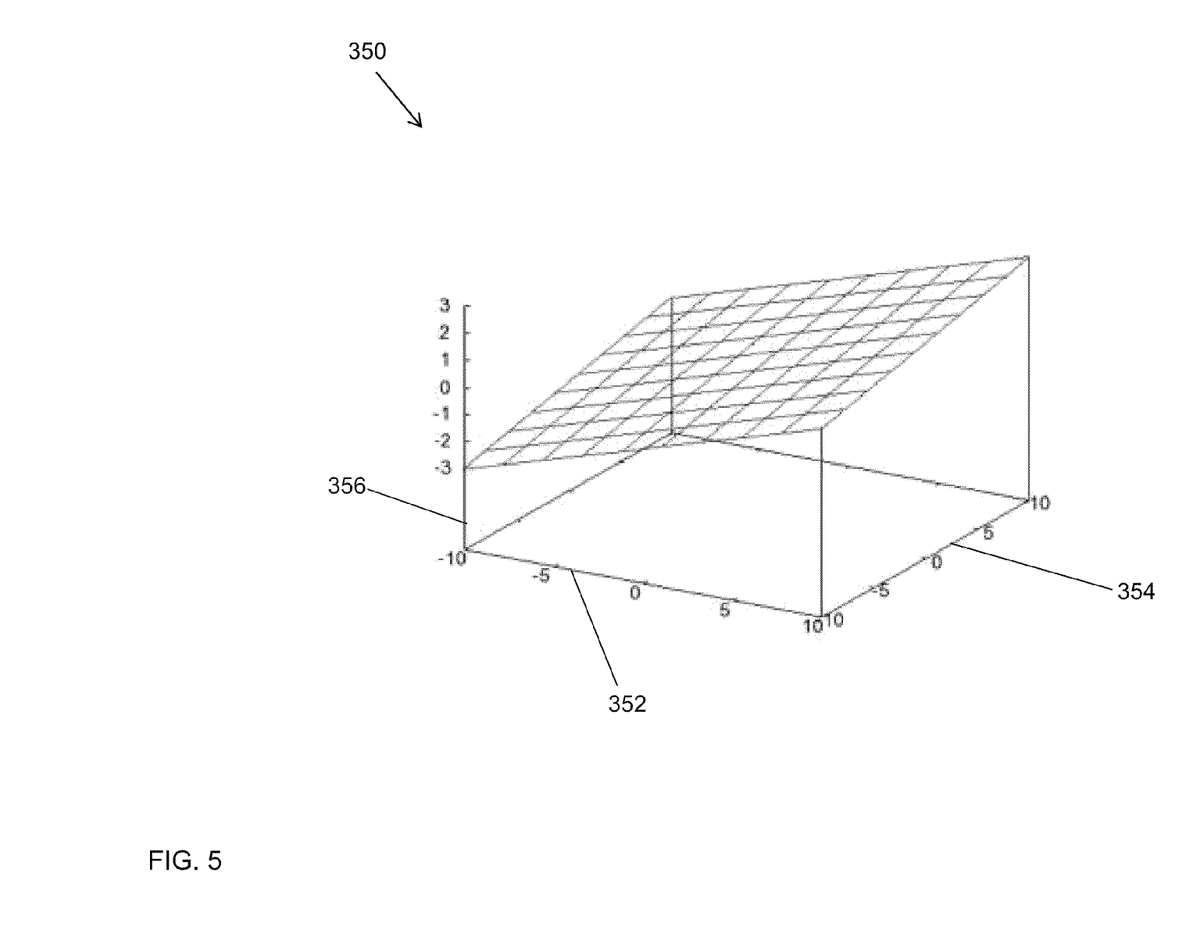
FIG. 5 shows a graphical representation of an ACLV function according to an embodiment.

Turning to FIG. 5, a three-dimensional graphical representation 350 of an embodiment of an ACLV function is shown. Graphical representation 350 includes an x-axis 352 representing increments of a first dimension of an IC, a y-axis 354 representing increments of a second dimension of the IC, and a z-axis 356 representing a relative amount of variation in devices on the IC. In this embodiment, the ACLV function may include equation (1) below:

$$ACLV_f(x,y)=Ax+By \tag{1}$$

In this embodiment, the ACLV function including equation (1) is a two dimensional gradient, which when illustrated on graphical representation 350, shows a substantially linear spatial correlation for dimensional variations of devices located on the IC. Devices with similar coordinates on the IC will have substantially similar dimensional variations, while devices which are located a distance apart will have a substantially constant increasing degree of variation relative one another.

Figure 6:
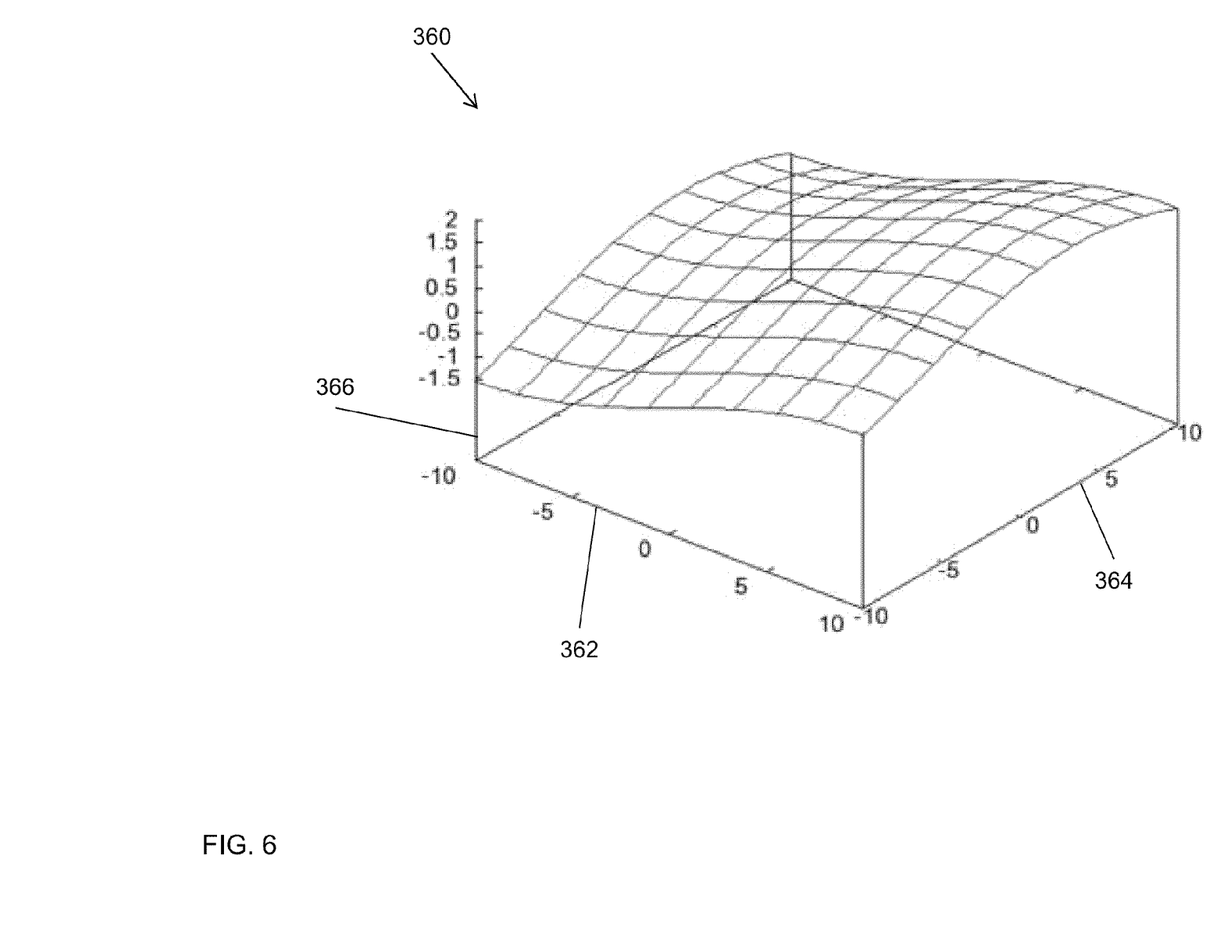
FIG. 6 shows a graphical representation of an ACLV function according to an embodiment.

Turning to FIG. 6, a three-dimensional graphical representation 360 of an embodiment of an ACLV function is shown. Graphical representation 360 includes an x-axis 362 representing increments of a first dimension of an IC, a y-axis 364 representing increments of a second dimension of the IC, and a z-axis 366 representing a relative amount of variation in devices on the IC. In this embodiment, the ACLV function may include equation (2) below:

$$ACLV_f=A \sin(w_1 x+f_1)+B \sin(w_2 y+f_2) \tag{2}$$

In this embodiment, the ACLV function including equation (2) is a trigonometric function with phase shift. This ACLV function generates a substantially smooth and continuous set of variation values. With this function, devices with similar coordinates on the IC will have dimensional variations which are more closely correlated than are devices which are located a distance apart. Compared to a linear function, this function is more physically accurate/realistic in several ways. The maximum variation is limited regardless of the total field size considered, and by including a random phase, every x-y location has the same probability density function for Delta L. Further, the range of values chosen for $w_1$ and $w_2$ allow the spatial correlation to be matched to the range observed in measured data.

Figure 7:
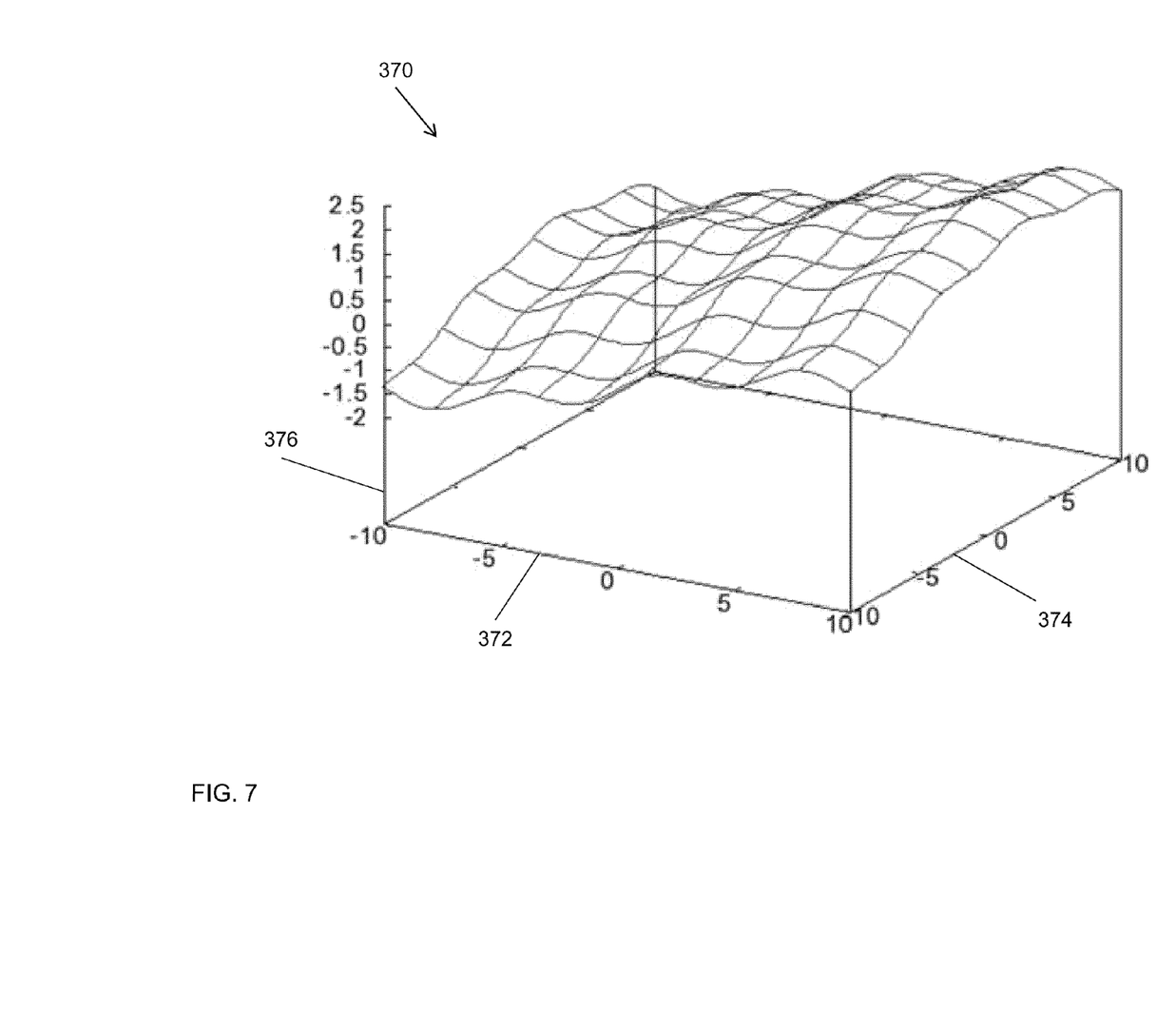
FIG. 7 shows a graphical representation of an ACLV function according to an embodiment.

Turning to FIG. 7, a three-dimensional graphical representation 370 of an embodiment of an ACLV function is shown. Graphical representation 370 includes an x-axis 372 representing increments of a first dimension of an IC, a y-axis 374 representing increments of a second dimension of the IC, and a z-axis 376 representing a relative amount of variation in devices on the IC. In this embodiment, the ACLV function may include equation (3) below:

$$ACLV_f=A \sin(w_1 x+f_1)+B \sin(w_2 y+f_2)+C \sin(w_3 x+f_3)+D \sin(w_4 y+f_4) \tag{3}$$

In this embodiment, the ACLV function including equation (3) is a trigonometric function with short and long-range variations. The short and long-range variations in this ACLV function enhance the variability values such that spatial correlations may be more precisely identified. Specifically, this function is useful when there are two different physical causes for variation which operate over different length scales. For example, a short range variation due to diffractive effects of the mask and a long range effect due to non-uniformity of the lithographic illumination source. With this function, devices with similar coordinates on the IC will have dimensional variations which are more closely correlated than will devices which are located a distance apart.

Figure 8:
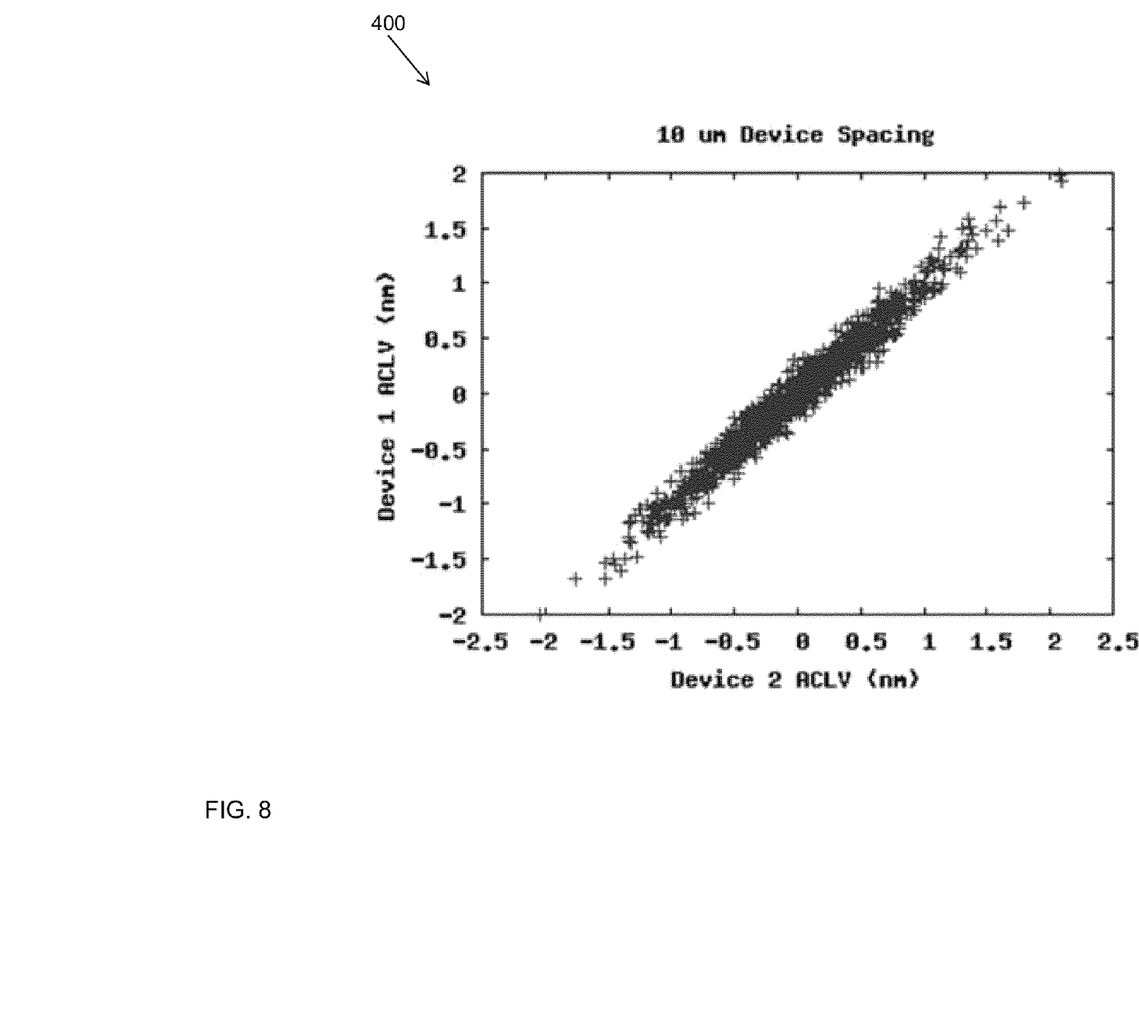
FIG. 8 shows a graphical representation of the results of a Monte Carlo simulation for an ACLV function according to an embodiment.
Figure 9:
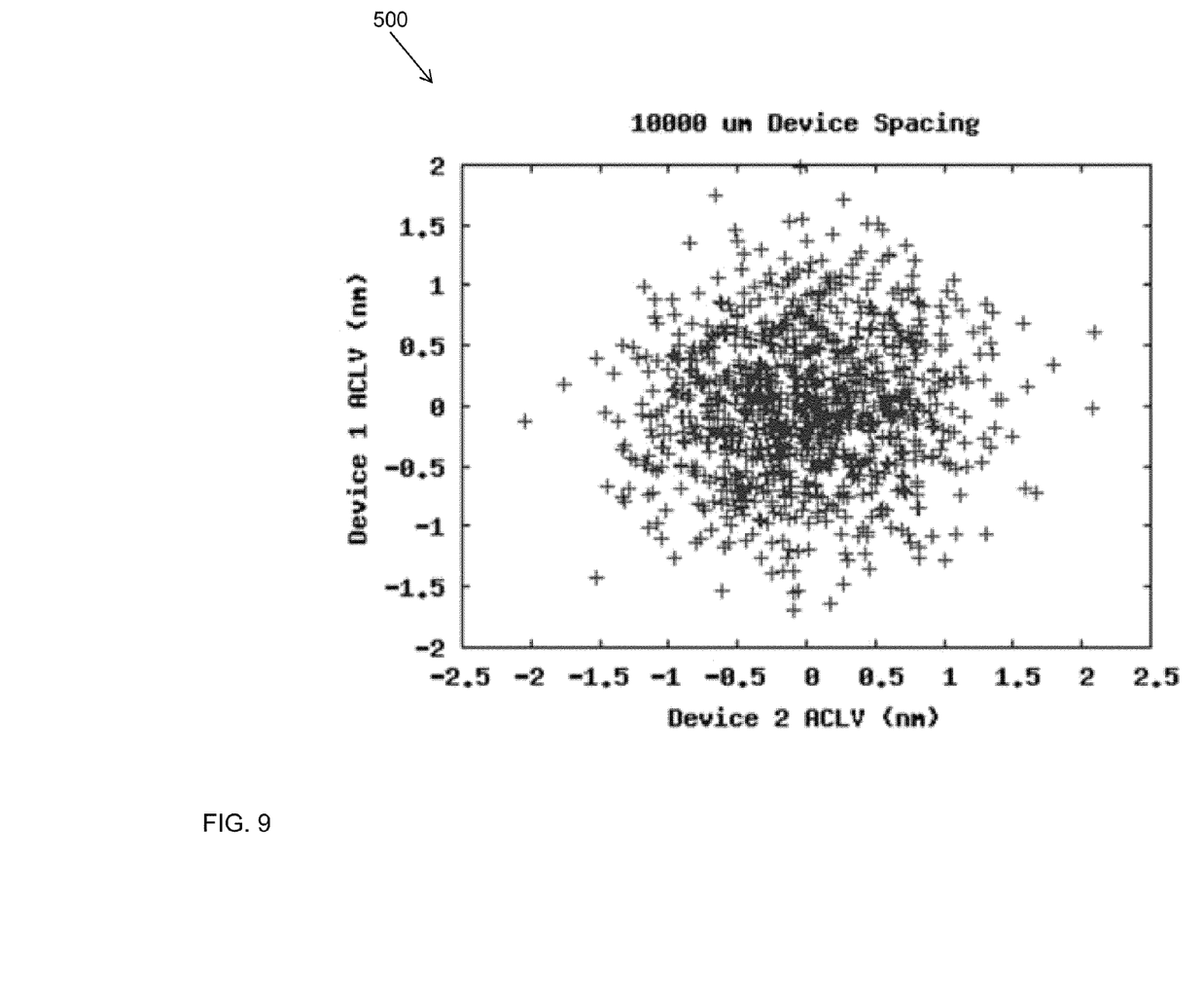
FIG. 9 shows a graphical representation of the results of a Monte Carlo simulation for an ACLV function according to an embodiment.

FIG. 8 illustrates a two-dimensional graphical representation 400 of the results of a Monte Carlo simulation using an ACLV function according to embodiments of the invention. In one embodiment, an ACLV function may be generated and evaluated for each device on an IC a plurality of times. The ACLV value obtained from each evaluation of each device may be stored in a distribution. In one embodiment, the distribution of ACLV values for a set of devices may be compared with the spacing of the devices (e.g., graphical representation 400). Graphical representation 400 shows the results of a set of Monte Carlo runs for two identical devices which are separated by 10 micrometers. The length variation of device 1 is plotted on the x-axis and the length variation of the device 2 is plotted on the y-axis. Because the correlation length in this example is much larger than 10 micrometers the plot shows high correlation. Turning to FIG. 9, a two-dimensional graphical representation 500 of the results of a Monte Carlo simulation for an ACLV function according to embodiments of the invention is shown. In this figure, results for a plurality of Monte Carlo simulations for two devices separated by 10,000 micrometers are shown. In graphical representation 500, the separation is much more than the correlation length, and thus no correlation is visible in this figure.

Figure 10:
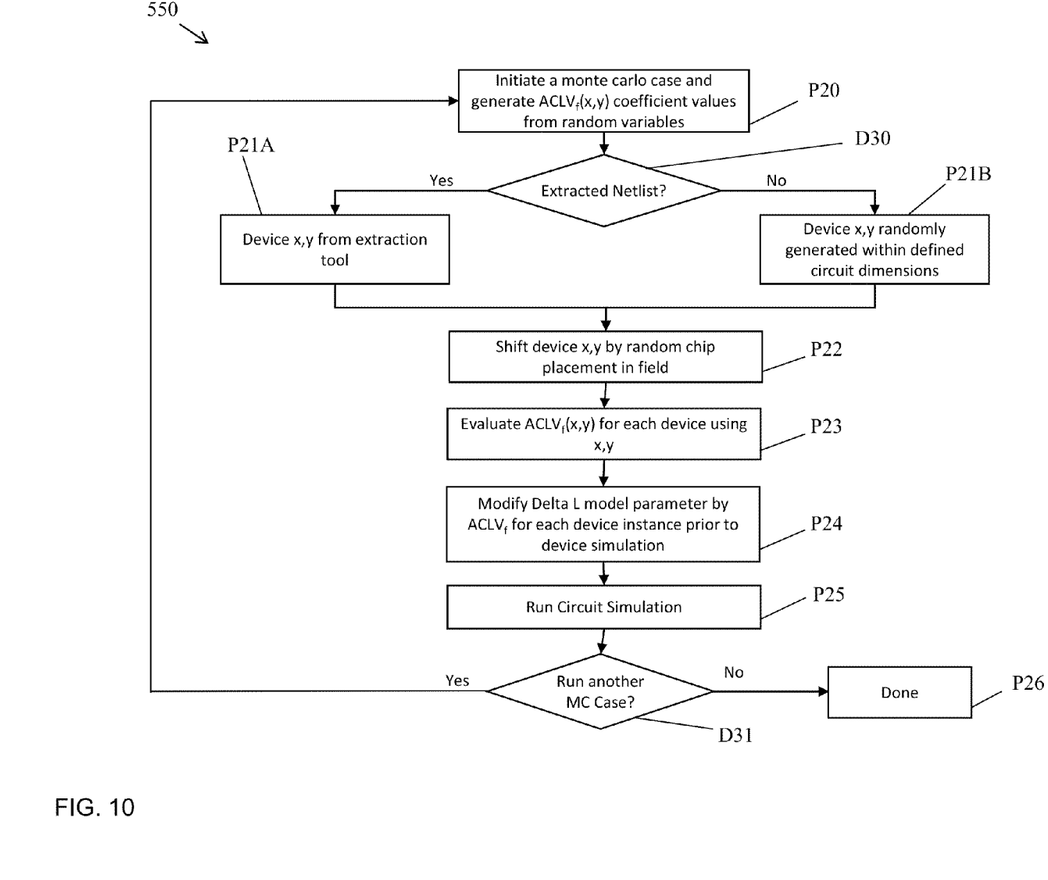
FIG. 10 shows a method flow diagram illustrating steps in a method of modeling ACLV in accordance with an embodiment.

Turning to FIG. 10, an illustrative method flow diagram 550 is shown illustrating a process according to aspects of the invention. In this embodiment, it is assumed that the circuit being designed is smaller in size than the photolithography field and that the ACLV probability distribution function is not the same in all locations in the photolithography field. For example, careful characterization of the mask generation process and photolithography printing process may show that there is more variation in one part of the field than in another. This process may be employed to model ACLV in ICs when the probability distribution function is not equivalent at all locations and a designer/user is unsure as to where in the photolithography field a circuit will be placed. In this embodiment, method flow diagram 550 includes a method for Monte Carlo modeling of ACLV for a set of devices and an IC. In process P20, a set of coefficient values for an ACLV function are generated, where the ACLV function involves an associated equation (e.g., (1), (2) or (3) illustrated and described herein), and the coefficient values are obtained from a set of random variables. In one embodiment, the coefficients may include factors for systematic variation (e.g., areas with high density PC, PC pitch, etc.). In another embodiment, the ACLV function may include a separate set of terms which account for systematic variation factors and/or effects, these terms based on layout information, PC density, RX, etc. This separate set of terms includes a set of independent coefficients which influence the ACLV function so as to further account for expected variances. In any event, these factors account for variations from deterministic effects on the ACLV of devices. Following process P20, at decision D30, it is determined whether or not an extracted netlist has been obtained. If at decision D30, it is determined that an extracted netlist has been obtained, then at process P21A, a set of coordinates (e.g., x and y) are obtained from the extracted netlist for each device on the IC. However, if at decision D30 it is determined that an extracted netlist has not been obtained, then at process P21B, a set of coordinates is randomly generated for each device on the IC. The set of randomly generated coordinates is located within a set of defined circuit dimensions. In one embodiment, the set of defined circuit dimensions may be user defined.

In any event, following either of process P21A or process P21B, in process P22, the device coordinates for each device are shifted by a random chip placement offset within the photolithography field for each instance of a subcircuit. That is, in each Monte Carlo case/instance, the coordinates of each device of a subcircuit are shifted by a random amount which is the same for each device in the subcircuit instance. This shift occurring for each subcircuit, each time a Monte Carlo case/instance is run, with the shift values being independent for each case/instance. This random chip placement offset accounts for the unknown circuit position in the photolithography field which must be considered in the case where the probability distribution function of the ACLV is not equivalent at all positions in the photolithography field. This provides the proper level of correlation between devices in the photolithography field (e.g., a high correlation between devices in a subcircuit and a lower correlation between devices in different subcircuits). Following process P22, in process P23, the ACLV function is evaluated for each device, using the generated coefficient values and the shifted coordinates of each device. The evaluation generates an anticipated attribute variation/Delta L for each device. Following process P23, in process P24, the variation/Delta L model parameter for each device is modified to incorporate the evaluation of the device based upon the ACLV function. Following process P24, in process P25, a circuit simulation is run for the IC, the circuit simulation including any or all of the modified variation parameters. Following process P25, in decision D31, it is determined whether or not another Monte Carlo case is to be run. In one embodiment, this decision may be user prompted. In another embodiment, decisions D31 may involve comparing the number of simulations run with a previously determined minimum number of simulations to be run. If in decision D31 it is determined that another simulation is to be run, then at process P20 a new set of coefficient values is again generated and the process repeated. If at decision D31 it is determined that another Monte Carlo case is not necessary, then at process P26 the simulation is stopped. This object may be used in a later-performed layout design process.

Figure 11:
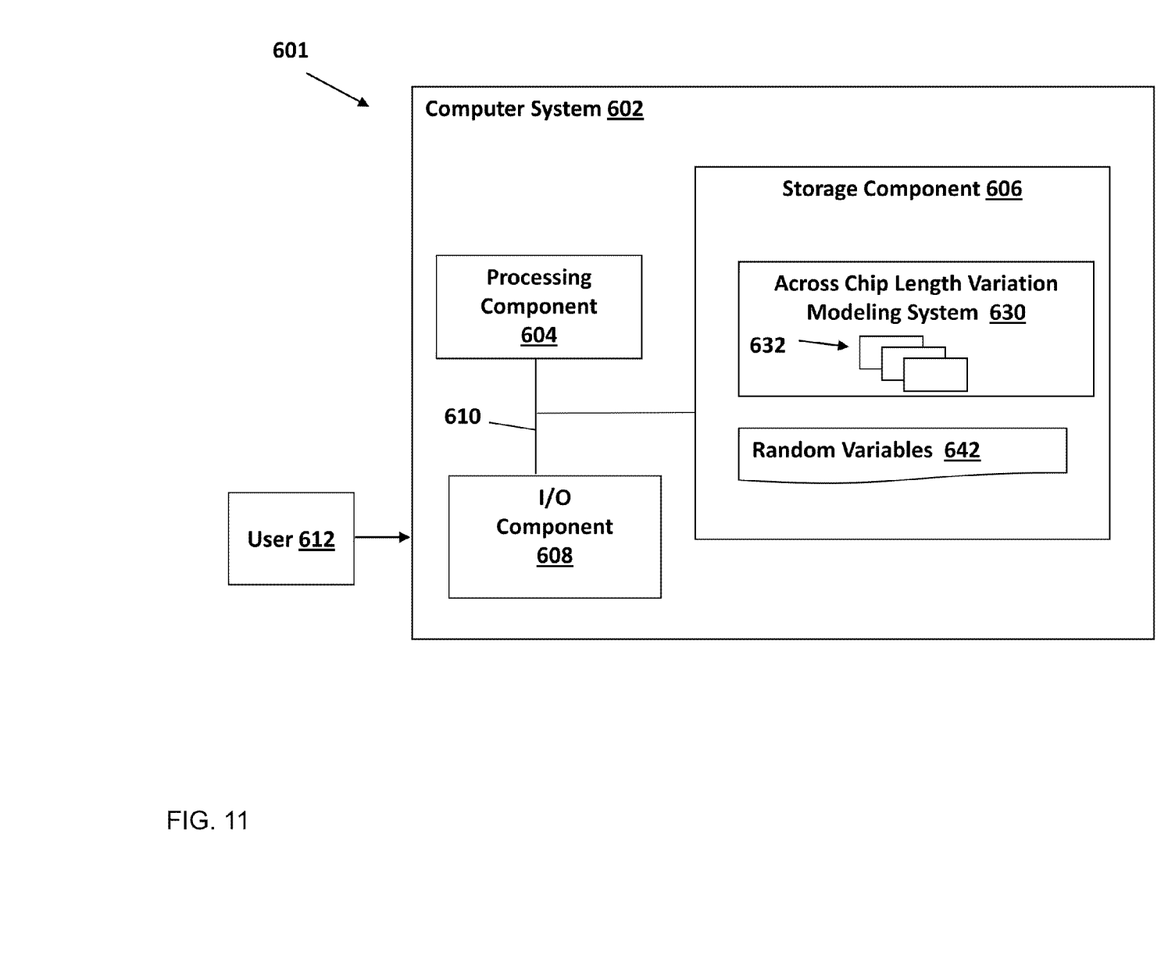
FIG. 11 shows an illustrative environment for modeling ACLV according to embodiments of the invention.

FIG. 11 depicts an illustrative environment 601 for modeling Across Chip Length Variation (ACLV) according to embodiments. To this extent, the environment 601 includes a computer system 602 that can perform a process described herein in order to model ACLV for a set of devices in an integrated circuit structure design. In particular, the computer system 602 is shown as including an across chip length variation modeling system 630, which makes computer system 602 operable to model the across chip length variation of components in an integrated circuit prior to the layout design phase by performing any/all of the processes described herein and implementing any/all of the embodiments described herein.

The computer system 602 is shown including a processing component 604 (e.g., one or more processors), a storage component 606 (e.g., a storage hierarchy), an input/output (I/O) component 608 (e.g., one or more I/O interfaces and/or devices), and a communications pathway 610. In general, the processing component 604 executes program code, such as the across chip length variation modeling system 630, which is at least partially fixed in the storage component 606. While executing program code, the processing component 604 can process data, which can result in reading and/or writing transformed data from/to the storage component 606 and/or the I/O component 608 for further processing. The pathway 610 provides a communications link between each of the components in the computer system 602. The I/O component 608 can comprise one or more human I/O devices, which enable a human user 612 to interact with the computer system 602 and/or one or more communications devices to enable a system user 612 to communicate with the computer system 602 using any type of communications link. To this extent, the across chip length variation modeling system 630 can manage a set of interfaces (e.g., graphical user interface(s), application program interface, etc.) that enable human and/or system users 612 to interact with the across chip length variation modeling system 630. Further, the across chip length variation modeling system 630 can manage (e.g., store, retrieve, create, manipulate, organize, present, etc.) data, such as random variables 642 using any solution.

In any event, the computer system 602 can comprise one or more general purpose computing articles of manufacture (e.g., computing devices) capable of executing program code, such as the across chip length variation modeling system 630, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the across chip length variation modeling system 630 can be embodied as any combination of system software and/or application software.

Further, the across chip length variation modeling system 630 can be implemented using a set of modules 632. In this case, a module 632 can enable the computer system 602 to perform a set of tasks used by the across chip length variation modeling system 630, and can be separately developed and/or implemented apart from other portions of the across chip length variation modeling system 630. As used herein, the term "component" means any configuration of hardware, with or without software, which implements the functionality described in conjunction therewith using any solution, while the term "module" means program code that enables the computer system 602 to implement the functionality described in conjunction therewith using any solution. When fixed in a storage component 606 of a computer system 602 that includes a processing component 604, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 602.

When the computer system 602 comprises multiple computing devices, each computing device may have only a portion of across chip length variation modeling system 630 fixed thereon (e.g., one or more modules 632). However, it is understood that the computer system 602 and across chip length variation modeling system 630 are only representative of various possible equivalent computer systems that may perform a process described herein. To this extent, in other embodiments, the functionality provided by the computer system 602 and across chip length variation modeling system 630 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 602 includes multiple computing devices, the computing devices can communicate over any type of communications link. Further, while performing a process described herein, the computer system 602 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 602 can obtain or provide data, such as spacing data, chip data, layout data, random variables 642 using any solution. For example, the computer system 602 can generate and/or be used to generate random variables 642, retrieve random variables 642, from one or more data stores, receive random variables 642, from another system, send random variables 642 to another system, etc.

While shown and described herein as a method and system for modeling across chip length variation of components in an integrated circuit, it is understood that aspects of the invention further provide various alternative embodiments. For example, in one embodiment, the invention provides a computer program fixed in at least one computer-readable medium, which when executed, enables a computer system to model across chip length variation of components in an integrated circuit. To this extent, the computer-readable medium includes program code, such as the across chip length variation modeling system 630 (FIG. 11), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the across chip length variation modeling system 630 (FIG. 11), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method for modeling across chip length variation of components in an integrated circuit. In this case, a computer system, such as the computer system 602 (FIG. 11), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method for modeling Spatially Correlated Variation (SCV) in a design of an Integrated Circuit (IC) using an Across Chip Length Variation (ACLV) function, the method comprising:
generating a set of coefficient values for the ACLV function, the set of coefficient values being selected from a set of random variables;
determining whether an extracted netlist for the IC has been obtained;
obtaining a set of coordinates defining a position of each of a plurality of devices in a defined field in the IC from the extracted netlist in response to determining that the extracted netlist has been obtained;
randomly generating the set of coordinates defining the position of each of the plurality of devices in the defined field in the IC in response to determining that the extracted netlist has not been obtained;
evaluating the ACLV function to determine a device attribute variation for each of the plurality of devices based upon the coordinates of each of the plurality of devices and the set of coefficient values;
modifying at least one model parameter based upon the evaluation of the ACLV function; and
running a circuit simulation using the at least one modified model parameter.

2. The computer implemented method of claim 1, wherein a size of the defined field is defined by a user.

3. The computer implemented method of claim 1, wherein the generating of the set of coefficient values further includes:
determining a set of deterministic coefficient values for the circuit, the set of deterministic coefficient values representing systematic variation effects.

4. The computer implemented method of claim 1, wherein the ACLV function is continuous.

5. The computer implemented method of claim 1, wherein the ACLV function includes a trigonometric function with a phase shift.

6. The computer implemented method of claim 1, wherein the ACLV function includes a trigonometric function with a set of short-range variations and a set of long-range variations.

7. A computer system comprising:
at least one computing device configured to model Spatially Correlated Variation (SCV) in an integrated circuit (IC) using an Across Chip Length Variation (ACLV) function by performing actions comprising:
generating a set of coefficient values for the ACLV function, the set of coefficient values being selected from a set of random variables;
determining whether an extracted netlist for the IC has been obtained;
obtaining a set of coordinates defining a position of each of a plurality of devices in a defined field in the IC from the extracted netlist in response to determining that the extracted netlist has been obtained;
randomly generating the set of coordinates defining the position of each of the plurality of devices in the defined field in the IC in response to determining that the extracted netlist has not been obtained;
evaluating the ACLV function to determine a device attribute variation for each of the plurality of devices based upon the coordinates of the plurality of devices and the set of coefficient values;
modifying at least one model parameter based upon the evaluation of the ACLV function; and
running a circuit simulation using the at least one modified model parameter.

8. The computer system of claim 7, wherein the generating of the set of coefficient values further includes:
determining a set of deterministic coefficient values for the circuit, the set of deterministic coefficient values representing systematic variation effects.

9. The computer system of claim 7, wherein the ACLV function is continuous.

10. The computer system of claim 9, wherein the ACLV function includes a trigonometric function with a phase shift.

11. The computer system of claim 7, wherein the ACLV function includes a trigonometric function with a set of short-range variations and a set of long-range variations.

12. A computer program comprising program code embodied in at least one non-transitory computer-readable medium, which when executed, enables a computer system to model Spatially Correlated Variation (SCV) for an integrated circuit design using an Across Chip Length Variation (ACLV) function by performing actions comprising:
generating a set of coefficient values for the ACLV function, the set of coefficient values being selected from a set of random variables;
determining whether an extracted netlist for the IC has been obtained;
obtaining a set of coordinates defining a position of each of a plurality of devices in a defined field in the IC from the extracted netlist in response to determining that the extracted netlist has been obtained;
randomly generating the set of coordinates defining the position of each of the plurality of devices in the defined field in the IC in response to determining that the extracted netlist has not been obtained;
evaluating the ACLV function to determine a device attribute variation for each of the plurality of devices based upon the coordinates of each of the plurality of devices and the set of coefficient values;
modifying at least one model parameter based upon the evaluation of the ACLV function; and
running a circuit simulation using the at least one modified model parameter.

13. The computer program of claim 12, wherein the generating of the set of coefficient values further includes:
determining a set of deterministic coefficient values for the circuit, the set of deterministic coefficient values representing systematic variation effects.

14. The computer program of claim 12, wherein the ACLV function includes a trigonometric function with a phase shift.

15. The computer program of claim 12, wherein the ACLV function includes a trigonometric function with a set of short-range variations and a set of long-range variations.

* * * * *